United States Patent [19]
Pratt

[11] Patent Number: 5,570,997
[45] Date of Patent: Nov. 5, 1996

[54] HORIZONTAL WINDMILL WITH FOLDING BLADES

[76] Inventor: Charles W. Pratt, 529 Saint Vrain La., Estes Park, Colo. 80517

[21] Appl. No.: 503,140

[22] Filed: Jul. 17, 1995

[51] Int. Cl.⁶ ............................................. F03D 3/00
[52] U.S. Cl. .................. 416/117; 416/132 A; 416/132 B; 416/139; 416/140; 416/142
[58] Field of Search .............................. 416/117, 132 A, 416/132 B, 139, 140, 142

[56] References Cited

U.S. PATENT DOCUMENTS

| | | | |
|---|---|---|---|
| 244,677 | 7/1881 | Sherwood | 416/117 |
| 346,797 | 8/1886 | Aylsworth. | |
| 354,972 | 12/1886 | Dodds et al. | |
| 713,094 | 11/1902 | Grist. | |
| 1,319,766 | 10/1919 | Gracey | 416/132 B |
| 1,413,339 | 4/1922 | Leimi | 416/117 |
| 4,045,148 | 8/1977 | Morin. | |
| 4,142,832 | 3/1979 | Clifton. | |
| 4,365,935 | 12/1982 | Zukeran. | |
| 4,377,372 | 3/1983 | Stutzman. | |
| 4,547,125 | 10/1985 | McMahon, II | 416/117 |

FOREIGN PATENT DOCUMENTS

| | | | |
|---|---|---|---|
| 0009651 | 1/1898 | Sweden | 416/117 |
| 1255737 | 9/1986 | U.S.S.R. | 416/117 |

*Primary Examiner*—F. Daniel Lopez
*Assistant Examiner*—Christopher Verdier
*Attorney, Agent, or Firm*—Christensen, O'Connor, Johnson & Kindness PLLC

[57] ABSTRACT

Windmill (10) having a plurality of hydrodynamic, folding blades (12, 14, 16 and 18) secured to a hub (64). The blades are propelled by wind current such that the windmill rotates about a central axis of a shaft (20) on which a hub (64) is journaled. Each folding blade extends radially from the hub and includes a lower blade portion (24) attached to the hub and an upper blade portion (22) pivotally attached to the lower blade portion. The lower blade portion includes a hydrodynamic surface extending from a first edge (43) and terminating at a trailing edge (42). The upper blade portion is hydrodynamically contoured so as to form a nose cone (44). An apex of the nose cone forms a leading edge (40) of the upper blade portion that is opposite a trailing edge (41). The nose cone is weighted such that the trailing edge of the upper blade portion balances in a position slightly separate from the trailing edge of the lower blade portion when the fluid current fails to flow at a speed that exceeds a minimum threshold. However, when the fluid current impinges the trailing edge of the upper blade portion and the fluid current flows at a speed that exceeds a minimum threshold, the weighted nose cone of the upper blade portion causes the upper blade portion to pivot away from the lower blade portion so that the trailing edge of the upper blade portion is separated from the trailing edge of the lower blade portion at an acute angle. Accordingly, when the fluid current ceases to impinge the trailing edge of the upper blade portion, the weighted nose cone of the upper blade portion causes the upper blade portion to pivot toward the lower blade portion such that the trailing edge of the upper blade portion approaches the trailing edge of the lower blade portion.

25 Claims, 3 Drawing Sheets

HORIZONTAL WINDMILL WITH FOLDING BLADES

FIELD OF THE INVENTION

This invention generally relates to windmills and, more specifically, to a mill having folding blades.

BACKGROUND OF THE INVENTION

Windmills and wind turbines are well known in the prior art. Such mills typically include a number of blades or vanes connected to a rotatable shaft. Wind flowing across the mill will cause hydrodynamic forces (i.e., forces generated by the movement of fluids including air and water) to build upon the blades, thereby causing the shaft and blades to revolve about the central axis of the shaft.

In order to increase efficiency of such known mills, and thus generate more power, mills have been constructed such that the blades are adjustable to present a variable surface area to the hydrodynamic flow of wind. When an individual blade is in the part of its revolution where the blade is moving parallel to the flow of the hydrodynamic medium, the blade adjusts to present maximum surface area to the medium. Conversely, when the blade is in the part of its revolution where the blade is moving perpendicular to the flow of the hydrodynamic medium, the blade adjusts to present minimum surface area to the medium. In this regard, the mills of the prior art typically include blades having two symmetrical halves. Minimum surface area is presented to the hydrodynamic medium by opening the two blade halves to a position parallel to the flow of the medium. In other words, the blade halves are oriented to a horizontal position to present minimum surface area to the hydrodynamic medium. Maximum surface area is presented to the hydrodynamic medium by rotating the trailing edges of each blade half away from one another so that each blade half forms a substantial angle relative to the medium such that a maximum surface area is presented to the hydrodynamic medium. To present maximum surface areas, the blade is rotated to a substantial angle relative to the hydrodynamic medium. Similar arrangements having single rotatable blades are also known.

While these known devices attempt to increase efficiency of the mill, these devices suffer from the same disadvantages. Specifically, the rotating symmetrical blade halves become unstable during rotation, causing the hydrodynamic medium to escape around the blades, which decreases efficiency. Further, the blades of the known devices require some mechanical advantage or mechanism to orient the blade halves away from one another. However, when the blades open cooperatively to define a broad profile and present a maximum surface area to the hydrodynamic medium, the blades no longer appear to operate as a wing, i.e., the blades are no longer hydrodynamic.

Accordingly, there is a need for a mill having fully stable, yet hydrodynamic folding blades that do not require a mechanical advantage or mechanism to operate.

SUMMARY OF THE INVENTION

The present invention provides a mill having a shaft and a plurality of hydrodynamic, weighted, folding blades secured to a hub journalled on the shaft and propelled by a fluid current such that the blades and the hub rotate about a central axis of the shaft. Each folding blade extends radially from the hub and includes a lower blade portion attached to the hub and an upper blade portion pivotally attached to the lower blade portion. The lower blade portion includes a relatively flat surface extending from a first edge and terminating at a trailing edge. The upper blade portion is hydrodynamically contoured so as to form a nose cone. An apex of the nose cone forms a leading edge of the upper blade portion that is opposite a trailing edge. The nose cone is weighted such that the trailing edge of the upper blade portion balances in a position slightly separate from the trailing edge of the lower blade portion when the fluid current impinging the trailing edge of the upper blade portion fails to flow at a speed that exceeds a minimum threshold.

When the fluid current impinges the trailing edge of the upper blade portion and the fluid current flows at a speed that exceeds a minimum threshold, the weighted nose cone of the upper blade portion causes the upper blade portion to pivot away from the lower blade portion so that the trailing edge of the upper blade portion is separated from the trailing edge of the lower blade portion at an acute angle. However, the upper blade portion is attached to the lower blade portion so that the upper blade portion cannot pivot away from the lower blade portion at an obtuse angle.

When the fluid current ceases to impinge the trailing edge of the upper blade portion, the weighted nose cone of the upper blade portion causes the upper blade portion to pivot toward the lower blade portion such that the trailing edge of the upper blade portion approaches the trailing edge of the lower blade portion.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
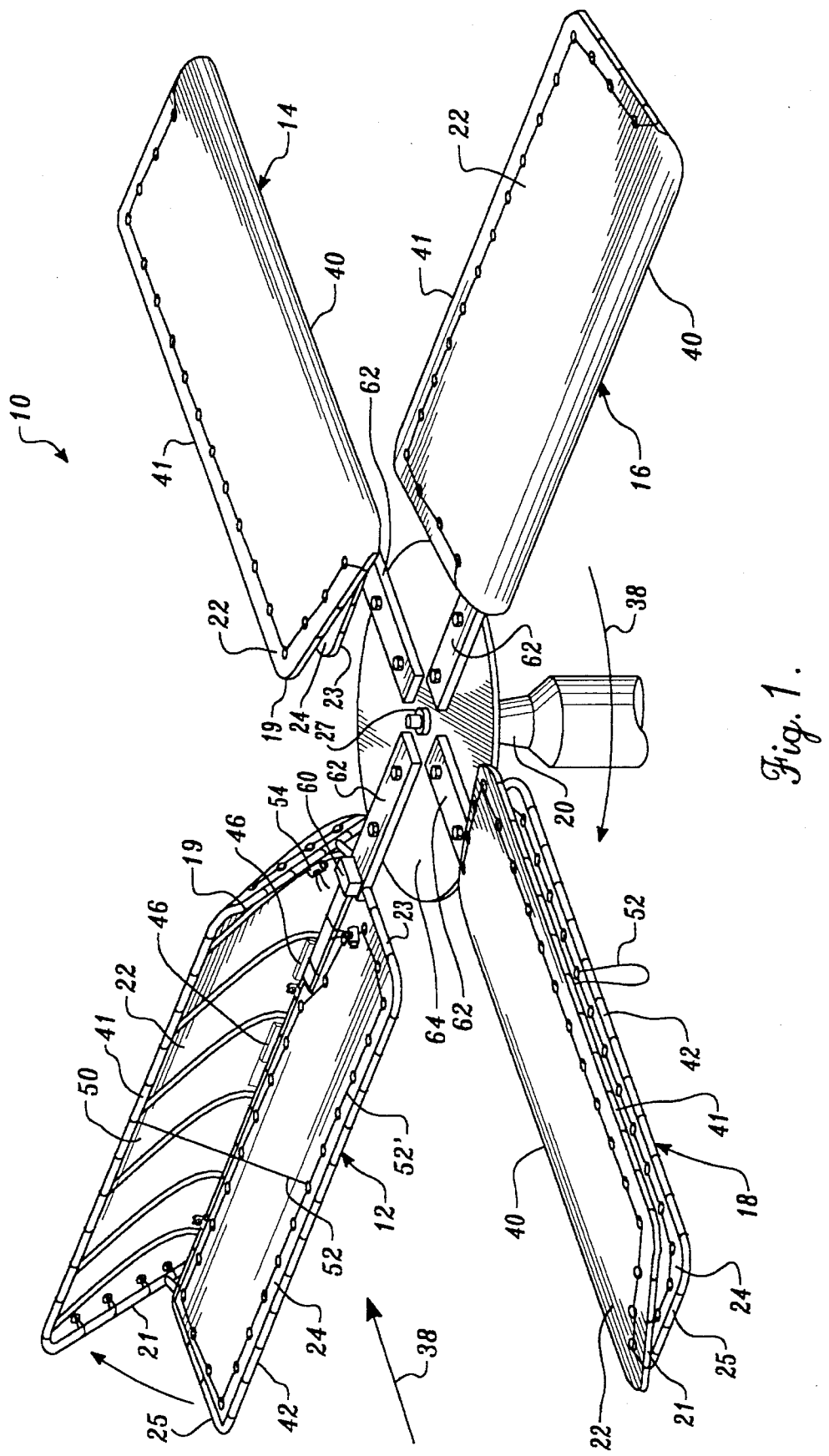
FIG. 1 is an isometric view of a mill having a plurality of folding blades formed in accordance with the present invention.

An isometric view of a preferred embodiment of the present invention is shown in FIG. 1. In the illustrated embodiment, a horizontal windmill 10 has a plurality of folding blades 12, 14, 16 and 18 projecting radially from a rotating hub 64 that is journalled on a generally vertical shaft 20. Wind blowing across the windmill 10 creates hydrodynamic forces on the blades 12, 14, 16 and 18, which in turn cause the hub 64 to rotate. In the illustrated embodiment, the hub 64 and blades rotate in the direction of arrow 38. The windmill 10 is referred to as a horizontal windmill because the blades rotate in a horizontal plane about a generally vertical axis. Although a horizontal windmill is illustrated, those of ordinary skill in the art will recognize that the present invention is equally applicable to windmills having blades that rotate in a vertical plane about a generally horizontal axis. Further, it will be appreciated that the present invention would be adapted for watermills and turbines.

Each folding blade 12, 14, 16 and 18 is attached to the hub 64, which is journalled axially on the distal upper end of the shall 20 by a bearing 27. Thus, the blades rotate in unison with the hub 64 on the shaft 20. Because the blades 12, 14, 16 and 18 are virtually identical, the following description of blade 12 applies equally to the remaining blades 14, 16 and 1.8. Therefore, the remaining blades will not be discussed in detail.

As shown in FIG. 1, the blade 12 includes an upper half 22 and a lower half 24 attached to one another by a pair of hinges 26. Each blade half is substantially rectangular in shape, having a length longer than its width. The upper blade half 22 has a first end 19 and a second end 21 defined along the width of the blade half. The upper blade half 22 is hydrodynamically contoured such that the first end 19 and the second end 21 of the upper blade half 22 are cupped and the upper blade half 22 acts much like a wing. The lower blade half 24 is flat and includes a first end 23 and a second end 25 defined along its width. The upper blade half 22 also includes a leading edge 40 defined as the longitudinal edge of the upper blade half which is facing in the same peripheral direction as the direction of rotation of the shaft indicated by direction arrow 38. Conversely, the upper blade half 22 includes a trailing edge 41 and the lower blade half 24 includes a trailing edge 42 which are defined as the longitudinal edges of the blade halves which face in the opposite direction.

When blade 12 is rotated to a position so that the direction of the wind is essentially blowing perpendicular is to the trailing edges 41 and 42 of the blade halves 22 and 24, the blade "opens." More specifically, the upper blade half 22 pivots outwardly with respect to lower blade half 24 to provide an inclined internal surface that resists the incoming wind current. Consequently, the blade 12 and thus, the hub 64, are forced to rotate in the direction of arrow 38. When a blade is rotated to a position such that the wind is essentially blowing perpendicularly to the leading edge 40 of the blade, such as blade 16 in FIG. 1, the upper blade half 22 pivots inwardly, toward the lower blade half 24, i.e., the blade 12 "closes" to minimize wind resistance. Blades that are in intermediate positions, as blades 14 and 18 are shown in FIG. 1, are in intermediate stages of opening and closing, respectively.

Figure 2:
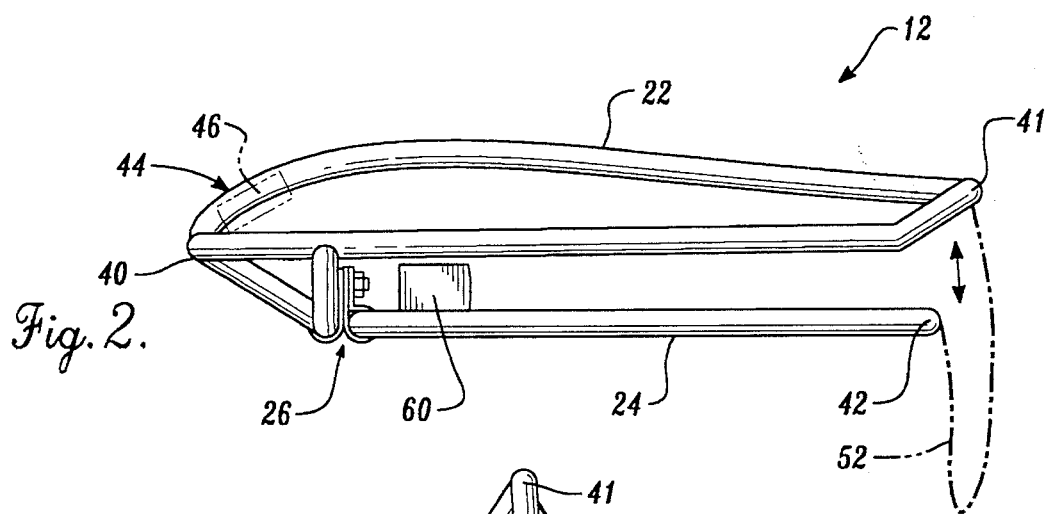
FIG. 2 is a profile view of one of the blades shown in FIG. 1 while in a balanced position.
Figure 3:
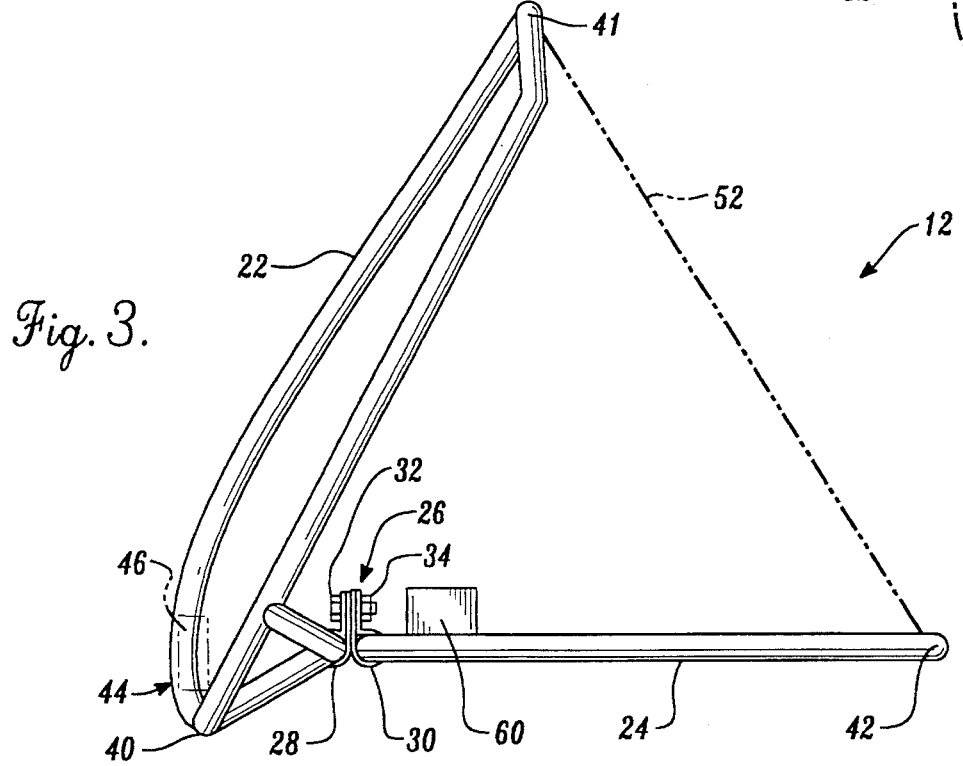
FIG. 3 is a profile view of the blade shown in FIG. 1 while in an open position.
Figure 4:
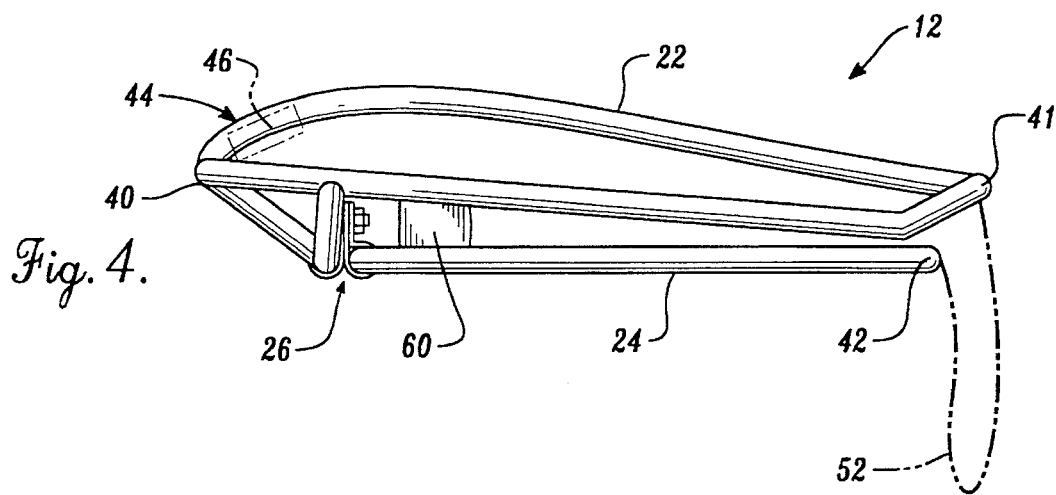
FIG. 4 is a profile view of the blade shown in FIG. 1 while in a closed position.

FIGS. 2, 3 and 4 are profile views of the second ends 19 and 21 of the upper and lower blade halves 22 and 24, respectively, at different points during the blade's rotation. As depicted in all three views, the upper blade half 22 is hydrodynamically contoured so as to form a nose cone 44, the apex of which forms the leading edge 40 of blade 12. Weights 46 that are used to balance the blade 12 in the open, closed and intermediate positions, are disposed within the nose cone 44.

As shown in FIG. 2, the weights 46 are disposed in the nose cone 44 so that the blade 12 assumes a balanced position, i.e., the position wherein the trailing edges 41 and 42 of the upper and lower blades are only slightly separated from one another, when the blade is at rest or when the wind speed is below a certain minimum threshold. Thus, the upper blade half 22 is weighted such that only the slightest breeze, i.e., a breeze whose speed barely surpasses the minimum threshold, will force the upper blade half 22 to pivot outwardly, away from the lower blade half 24. In the preferred embodiment of the present invention, the minimum threshold wind speed is five miles per hour. However, in other embodiments of the present invention, the upper blade half 22 can be weighted such that the minimum threshold ranges between five and ten miles per hour.

Preferably, the weights 46 are disposed within the nose cone 44 along the leading edge 40 of the upper blade half 22, on either side of the hinge 26 located toward the second end 21 of the upper blade half. The weights 46 are disposed in this manner so that their weight is evenly distributed across the hinge 26 and does not impede the ability of the hinge to pivot. Further, the weights 46 are disposed toward the second end 21 of the upper blade half 22 so as to avoid making the blade 12 top heavy at its first end 19. Those of ordinary skill in the art will appreciate that by using weights, the need for a mechanical device, such as a spring, to force the upper blade half 22 to pivot is eliminated.

The positioning and quantity of the weights 46 are selected so that the upper blade half 22 comes to rest at a predetermined balanced position when there is less than a minimum threshold wind velocity. While this balanced position is illustrated as nearly closed in FIG. 2, it should be alternately apparent that other predetermined balanced positions, such as opened, could be selected by adjusting the magnitude and lateral positioning of the weights 46 relative to the hinge 26. The critical determination is that the weights be sized and located to allow opening and closing at very low wind speeds, for efficient operation of the windmill.

In the face of the oncoming breeze, the weighted upper blade half 22 will continue to pivot outwardly or "unfold" until it reaches the fully open position shown in FIG. 3. In the open position, the trailing edges 41 and 42 of the blade halves 22 and 24 are fully separated from one another, presenting the inclined internal surface in resistance to the incoming current which is prevented from escaping around edges of the blade 12 by the cupped first end 19 and second 21 of the upper blade half 22. Thus, the cupped first end 19 and second end 21 increase the stability of the upper blade half 22 and assist the weights 46 in opening the blade 12. However, in the preferred embodiment of the present invention, the upper blade half 22 is prevented from pivoting to an angle greater than approximately 75° with respect to the lower blade half 24 by a portion 52 of elastic cord 52' attached to the middle of each blade half. If the upper blade half 22 were to pivot to an angle greater than approximately 75° but less than 90°, the blade 12 would become unstable as the wind current escaped over and under the trailing edges 41 and 42 and around the first ends 19 and 23 and second ends 21 and 25 of the blade 12. Further, if the upper blade half 22 was allowed to pivot to an angle greater than 90°, the upper blade half would no longer provide a resisting surface to the wind current. In addition, the portion 52 of elastic cord 52' serves to elongate and absorb shock when gusts of wind hit the blades 12, thus reducing damage to the blade 12.

As the blade 12 continues to rotate and the wind begins to blow at essentially an obtuse angle with respect to the leading edge 40 of the blade 12, the wind current ceases to impinge the inclined, resisting surface presented by the upper blade half 22. Consequently, the weights 46 cause the upper blade half to pivot inwardly or "fold" toward the lower blade half 24 until the blade 12 reaches a closed position as shown in FIG. 4. In the closed position, the trailing edges 41 and 42 of the blade halves 22 and 24 are adjacent one another and the wind is essentially blowing perpendicular to the leading edge 40 of the blade. The hydrodynamically contoured upper blade half 22 including the weighted nose cone 44 provides a hydrodynamic surface over which the wind current flows at minimal resistance, thus reducing drag and increasing the efficiency of the blade rotation. However, the trailing edge 41 of the upper blade half 22 is slightly upturned leaving a small gap between the trailing edge 41 of the upper blade half 22 and the trailing edge 42 of the lower blade half 24 such that it is easier for the wind current to impinge the weighted, upper blade half 22 and cause it to pivot toward the open position. In the preferred embodiment of the present invention, a rubber cushion 60 is mounted on the upper surface of the lower blade half 24 to reduce shocks as the upper blade half 22 reaches the closed position.

One of ordinary skill in the art will recognize that as the blade continues to rotate and the wind begins to blow at an essentially acute angle to the leading edge 40 of the blade, the wind begins to blow against the upturned trailing edge 41 and the cupped first end 19 and second end 21 of the upper blade half 22 causing the weighted, upper blade half to pivot outwardly in resistance to the wind current. Eventually, as the blade continues to rotate and resist the wind current, the blade 12 reaches the open position shown in FIG. 3. As long as the wind speed surpasses the minimum threshold, the blade 12 will continue to oscillate between the open and closed positions depicted in FIGS. 3 and 4. However, sudden gusts of wind greatly exceeding the minimum threshold may appear and disappear very quickly, causing the blade 12 to open and close and the speed of blade rotation to increase and decrease accordingly. However, the blade 12 is weighted such that if the wind current suddenly stops, the blade 12 will not suddenly stop and snap closed. Rather, the weighted blade 12 will fold gradually to the closed position until the blade's rotation slows to the current wind speed and the blade begins to reopen. Thus, the blade 12 is not damaged.

Figure 5:
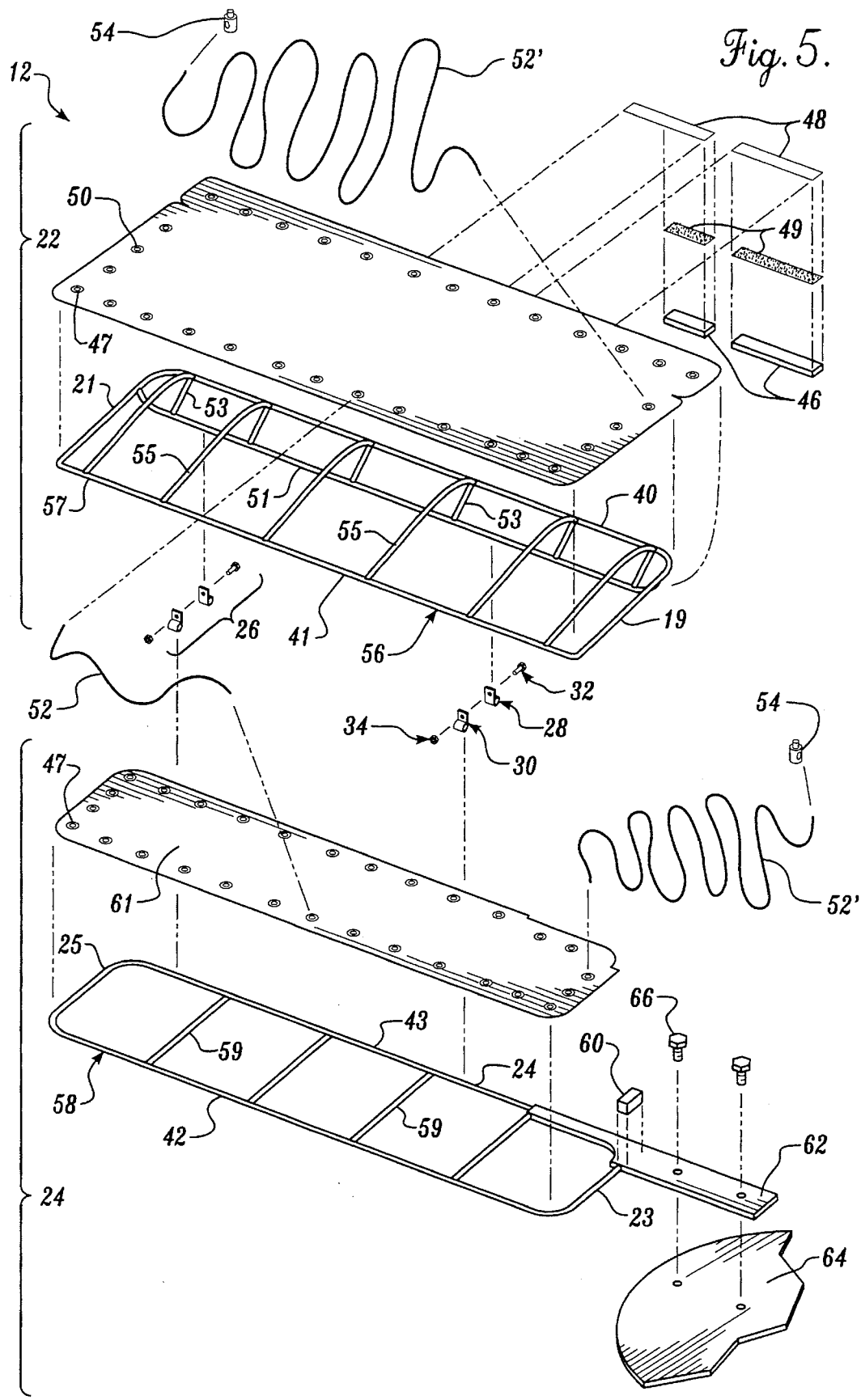
FIG. 5 is an exploded view of the blade shown in FIG. 1.

Now that the operation of the folding blade 12 has been discussed, the construction of the blade will be described in further detail. As shown more clearly in FIG. 5, upper blade half 22 and lower blade half 24 each comprise a frame covered by a skin or shell. More specifically, upper blade half 22 includes an upper blade frame 56 made from light-weight aluminum tubing. However, it will be appreciated that various other light-weight, durable metals, alloys or plastics can be used for this purpose. The upper blade frame 56 includes a substantially rectangular rim 57. A plurality of hydrodynamically contoured cross-bars 55 extend between the trailing edge 41 and the leading edge 40 of the upper blade half 24. More specifically, each cross-bar 55 is hydrodynamically contoured so that it slopes upwardly from the leading edge 40 to a point approximately one-third the width of the frame and then slopes downwardly toward the trailing edge 41. Further, the upper blade frame 56 also includes a support beam 51 that extends longitudinally from the first end 19 to the second end 21 of the upper blade half. A plurality of supportive cross-bars 53 slope downwardly from the leading edge 40 of the upper blade half 22 at an acute angle and terminate at the support beam 51.

The upper blade frame 56 is covered with a skin 50 such that the skin overlies the hydrodynamic cross-bars 55 and the supportive cross-bars 53 of the upper blade frame to form the nose cone 44. A number of rivets 47 are defined through the outside edge of the skin 50. The skin 50 is secured to the upper blade frame 56 by the elastic cord 52' that is woven through the rivets 47 and around the rim 57 of the upper blade frame. However, the elastic cord is continuously threaded through the rivets 47 of the skin 50 and the lower blade half 24 such that the portion 52 the elastic cord 52' extends between the middle of the trailing edge 41 of the upper blade half 22 and the middle of the trailing edge 42 of the lower blade half 24. When the blade 12 "unfolds," the slack portion 52 becomes taught and prevents the upper blade half from pivoting too far as the blade 12 opens. However, it will be appreciated that the elastic cord 52' may be threaded such that the slack portion 52 extends between the blade halves at any point on the trailing edges 41 and 42, on the first ends 19 and 23, or on the second ends 21 and 25 of the blade halves 22 and 24, respectively. Once threaded, the elastic cord 52' is secured to the upper blade half 22 by an adjustable cord clamp 54 so that the tension in the elastic cord 52 can be easily adjusted. Those of ordinary skill in the art will appreciate that the skin 50 can be made from various materials. In the preferred embodiment of the present invention, the skin 50 is made of a heavy nylon such as that used to make sails. However, other materials can be suitably used including both natural and synthetic fabric, injection molded plastic or light-weight metal sheeting.

When assembled, the skin 50 covers the hydrodynamic cross-bars 55 and the supportive cross-bars 53 of the support beam 51, forming the nose cone 44. As described above, the weights 46 are selectively secured to the skin along the leading edge 40 of the upper blade half, on either side of the hinge 26 located toward the second end 21 such that the upper blade half 22 may pivot to the predetermined balanced position when there is less than a minimum threshold wind velocity. The weights 46 are secured to the skin 50 of the nose cone 44 by a fastener. In the preferred embodiment of the present invention, a hook-and-loop fastener such as Velcro is used. As shown in FIG. 4, a first strip 49 having a plurality of loops is attached to the weights 46 and a second strip 48 having a plurality of hooks is attached to the skin 50. The weights 46 may then be selectively attached to the skin 50 as necessary to ensure that the blade 12 will assume the balanced position when at rest, and oscillate between the open and closed positions when rotating.

The lower blade half 24 comprises a substantially rectangular lower blade frame 58. In the preferred embodiment of the present invention, the lower blade frame 58 is also made from light-weight aluminum tubing. A plurality of linear cross-bars 59 extend between the trailing edge 42 of the lower blade frame and an opposing edge 43. A skin 61 having a plurality of rivets 47 defined through its outer edge is secured to the lower blade frame 58 by the cord 52 that is woven through the rivets 47 and around the lower blade frame 58. Another adjustable cord clamp 54 is used to secure and adjust the tension in the elastic cord 52. Finally, a mounting bar 62 extends outwardly from the first end 23 of the lower blade frame 58 and is used to attach the blade 12 to the rotating hub 64 mounted upon the shaft 20. The mounting bar 62 is attached to the hub by a pair of bolts 66.

The upper blade half 22 and the lower blade half 24 are attached to one another by a pair of hinges 26. Each hinge 26 is positioned between the support beam 51 of the upper frame 56 and the edge 43 opposite the trailing edge 42 of the lower frame 58. Further, each hinge 26 is positioned past the midpoint of each half near the first end 21, 25 and second ends 19, 23, respectively, such that the weight of upper blade half 22 is equally distributed along its length. Each hinge 26 comprises a first hinge half 28 and a second hinge half 30. The first hinge half 28 attaches to the support beam 51 while the second hinge half 30 attaches to the lower blade frame 58. Finally, the first and second hinge halves and thus the upper blade half 22 and the blade half 24, are mounted to one another by a bolt 32 and nut 34.

While the preferred embodiment of the present invention has been illustrated and described, it will be appreciated that various changes can be made therein without departing from the spirit and scope of the invention. For example, a plurality of windmills formed in accordance with this invention may be stacked one on top of the other so that a horizontal windmill is provided having a plurality of parallel blades rotating about the same axis, resulting in a greater density of blades per unit area.

The embodiments of the invention in which an exclusive property or privilege is claimed are defined as follows:

1. An energy generating fluid-propelled mill propelled by a fluid current moving at varying speeds comprising:
   a) a shaft;
   b) a rotatable hub journalled to one end of the shaft; and
   c) a plurality of blades extending radially from the hub, each blade including:
      i) a first blade portion; and
      ii) a second blade portion hingedly attached to the first blade portion to pivot between a fully open position and a fully closed position, wherein the first blade portion is weighted such that it pivots to a less than fully open balanced position with respect to the second blade portion when the speed of the fluid current fails to exceed a minimum threshold.

2. The mill of claim 1, wherein the first blade portion defines a leading edge and a trailing edge, and the first blade portion is weighted such that the first blade portion pivots from the balanced position toward the fluid-resisting, fully open position as the fluid current impinges the trailing edge of the first blade portion and the speed of the fluid current exceeds the minimum threshold.

3. An energy generating fluid-propelled mill propelled by a fluid current moving at varying speeds comprising:
   a) a shaft;
   b) a rotatable hub journalled to one end of the shaft; and
   c) a plurality of blades extending radially from the hub, each blade including:
      i) a first blade portion; and
      ii) a second blade portion hingedly attached to the first blade portion wherein the first blade portion defines a leading edge and a trailing edge, and the first blade portion is weighted such that the first blade portion pivots: to a balanced position with respect to the second blade portion when the speed of the fluid current fails to exceed a minimum threshold; from the balanced position toward a fluid-resisting, open position as the fluid current impinges the trailing edge of the first blade portion and the speed of the fluid current exceeds the minimum threshold; and from the open position toward a non-resisting, closed position as the fluid current ceases to impinge the trailing edge of the first blade portion.

4. The mill of claim 3, wherein the second blade portion defines a trailing edge and in the resisting, open position, the first blade portion pivots away from tile second blade portion such that the trailing edge of the first blade portion is separated from the trailing edge of the second blade portion.

5. The mill of claim 4, further comprising a restraint connected to at least one of the first and second blade portions such that the first blade portion is prevented from pivoting away from the second blade portion at an obtuse angle.

6. The mill of claim 5, wherein the restraint comprises a cord attaching the first blade portion to the second blade portion.

7. The mill of claim 3, wherein the second blade portion defines a trailing edge and in the non-resisting, closed position, the first blade portion pivots toward the second blade portion such that the trailing edge of the first blade portion is adjacent the trailing edge of the second blade portion.

8. The mill of claim 3, wherein the first blade portion further comprises a first blade frame covered by a first blade shell so as to form a hydrodynamic surface extending from the leading edge to the trailing edge of the first blade portion.

9. The mill of claim 8, wherein the first blade frame of the first blade portion comprising:
   a) a substantially rectangular-shaped rim having a first end, a second end, a first longitudinal side and a second longitudinal side, the first longitudinal side forming the leading edge of the first blade portion, the second longitudinal side forming the trailing edge of the first blade portion;
   b) a plurality of hydrodynamically contoured cross-bars extending between the first and second longitudinal sides;
   c) a support beam extending between the first end and the second end; and
   d) a plurality of supportive cross-bars extending between the first longitudinal side and the support beam.

10. The mill of claim 9, wherein the first blade shell covers the hydrodynamically contoured cross-bars and supportive cross-bars of the upper blade frame so as to form a nose cone, wherein an apex of the nose cone forms the leading edge of the first blade portion, and wherein a weight is selectively disposed within the nose cone at a predetermined position to balance the blades.

11. The mill of claim 10, wherein the second blade portion further comprises a lower blade frame covered by a second blade shell, the second blade frame comprising:
   a) a substantially rectangular-shaped rim having a first end, a second end, a first longitudinal side and a second longitudinal side, the second longitudinal side forming the trailing edge of the second blade portion; and
   b) a plurality of cross-bars extending between the first and second longitudinal sides of the second blade frame.

12. The mill of claim 11, wherein the first blade shell and the second blade shell are secured to the first blade frame and the second blade frame, respectively, by an adjustable cord.

13. The mill of claim 9, wherein the support beam of the first blade frame is attached to the first longitudinal side of the second blade frame by at least one hinge.

14. The mill of claim 2, wherein the first blade portion includes a weighted nose cone section that defines the leading edge of the first blade portion, the first blade portion being hingedly secured to the second blade portion along a line spaced inwardly from the leading edge towards the trailing edge of the first blade portion.

15. An energy generating fluid propelled mill comprising:
   a) a shaft;
   b) a rotatable hub mounted upon the shaft; and
   c) a plurality of folding blades propelled by a fluid current such that the blades and hub rotate about a central axis of the shaft, each blade extending radially from the hub and including:
      i) a first blade portion attached to the hub, the first blade portion having a trailing edge; and
      ii) a second blade portion pivotally attached to the first blade portion to pivot between a fully open position and a fully closed position, the second blade portion being hydrodynamically contoured so as to form a nose cone, an apex of the nose cone forming a leading edge of the second blade portion that is opposite a trailing edge of the second blade portion, the nose cone being weighted such that the trailing edge of the second blade portion balances in a predetermined less than fully open position relative to the trailing edge of the first blade portion when the fluid current fails to flow at a speed that exceeds a minimum threshold.

16. An energy generating fluid propelled mill comprising:
a) a shaft;
b) a rotatable hub mounted upon the shaft; and
c) a plurality of folding blades propelled by a fluid current such that the and hub rotate about a central axis of the shaft, each blade extending radially from the hub and including:
  i) a first blade portion attached to the hub, the first blade portion having a trailing edge; and
  ii) a second blade portion pivotally attached the first blade portion, the second blade portion being hydrodynamically contoured so as to form a nose cone, an apex of the nose cone forming a leading edge of the second blade portion that is opposite a trailing edge of the second blade portion, the nose cone being weighted such that the trailing edge of the second blade portion balances in a predetermined position relative to the trailing edge of the first blade portion when the fluid current fails to flow at a speed that exceeds a minimum threshold, and the second blade portion pivots away from the first blade portion and the trailing edge of the second blade portion is separated from the trailing edge of the first blade portion at an acute angle as the fluid current impinges the trailing edge of the second blade portion and the speed of the fluid current exceeds the minimum threshold.

17. The fluid propelled mill of claim 16, wherein the nose cone of the second blade portion is weighted such that the second blade portion pivots toward the first blade portion and the trailing edge of the second blade portion approaches the trailing edge of the first blade portion as the fluid current ceases to impinge the trailing edge of the second blade portion.

18. The fluid propelled mill of claim 17, wherein the second blade portion is attached to the first blade portion such that the second blade portion is prevented from pivoting away from the first blade portion at an obtuse angle.

19. The fluid propelled mill of claim 18, wherein the first blade portion further comprises a first blade frame covered by a first blade shell, wherein the first blade frame comprises:

a) a substantially rectangular-shaped rim having a first end, a second end, a first longitudinal side and a second longitudinal side, the second longitudinal side forming the trailing edge of the first blade portion; and
b) a plurality of cross-bars extending between the first and second longitudinal sides of the first blade frame.

20. The fluid propelled mill of claim 19, wherein the first blade portion further comprises a shock absorbing cushion mounted on the first blade frame.

21. The fluid propelled mill of claim 20, the second blade portion further comprising a second blade frame covered by a second blade shell so as to form a hydrodynamic surface extending from the leading edge to the trailing edge of the second blade portion.

22. The fluid propelled mill of claim 21, wherein the second blade frame of the upper blade portion comprises:
a) a substantially rectangular-shaped rim having a first end, a second end, a first longitudinal side and a second longitudinal side, the first longitudinal side forming the leading edge of the second blade portion, the second longitudinal side forming the trailing edge of the second blade portion;
b) a plurality of hydrodynamically contoured cross-bars extending between the first and second longitudinal sides;
c) a support beam extending between the first end and the second end; and
d) a plurality of supportive cross-bars extending between the first longitudinal side and the support beam.

23. The fluid propelled mill of claim 22, wherein the second blade shell covers the hydrodynamically contoured cross-bars and supportive cross-bars of the second blade frame so as to form the nose cone, wherein a weight is selectively disposed within the nose cone.

24. The fluid propelled mill of claim 23, wherein the second blade shell and the first blade shell are secured to the second blade frame and the first blade frame, respectively, by an adjustable cord.

25. The fluid propelled mill of claim 24, wherein the support beam of the second blade frame is pivotally attached to the first longitudinal side of the first blade frame by at least one hinge.

* * * * *

UNITED STATES PATENT AND TRADEMARK OFFICE
CERTIFICATE OF CORRECTION

PATENT NO. : 5,570,997
DATED : November 5, 1996
INVENTOR(S) : C.W. Pratt

It is certified that error appears in the above-indentified patent and that said Letters Patent is hereby corrected as shown below:

| COLUMN | LINE | |
|---|---|---|
| 7 (Claim 4, | 52 line 3) | "from tile second blade" should read --from the second blade-- |
| 9 (Claim 16, | 11 line 5) | "such that the and" should read --such that the blades and-- |
| 9 (Claim 16, | 17 line 10) | "attached the" should read --attached to the-- |

Signed and Sealed this

First Day of April, 1997

Attest:

BRUCE LEHMAN

*Attesting Officer*   Commissioner of Patents and Trademarks